(12) United States Patent
Nakai

(10) Patent No.: US 7,728,651 B2
(45) Date of Patent: Jun. 1, 2010

(54) DRIVE CIRCUIT, VOLTAGE CONVERSION DEVICE AND AUDIO SYSTEM

(75) Inventor: Takayuki Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/262,623

(22) Filed: Oct. 31, 2008

(65) Prior Publication Data

US 2009/0115495 A1 May 7, 2009

(30) Foreign Application Priority Data

Nov. 7, 2007 (JP) ............................. 2007-290046

(51) Int. Cl.
*G05F 1/10* (2006.01)
(52) U.S. Cl. ...................... 327/536; 327/111
(58) Field of Classification Search ......... 327/108–112, 327/170, 389, 391, 544, 536, 535; 326/82, 326/83, 22–27; 365/230.06; 363/59, 60
See application file for complete search history.

(56) References Cited

U.S. PATENT DOCUMENTS 6,518,818 B1    2/2003    Hynes

2007/0210774 A1    9/2007    Kimura et al.

FOREIGN PATENT DOCUMENTS

JP    2001-127615    5/2001

*Primary Examiner*—Long Nguyen
*Assistant Examiner*—Sibin Chen
(74) *Attorney, Agent, or Firm*—McDermott Will & Emery LLP

(57) ABSTRACT

The first control transistor is connected between a first input node for receiving a first input signal swinging between a first voltage and a second voltage and an intermediate node for outputting an output signal, and receives the second voltage at its gate. The second control transistor is connected between a second input node for receiving a second input signal swinging between a third voltage and a fourth voltage in synchronization with the first input signal and the intermediate node, and receives the third voltage at its gate. The voltage difference between the first voltage and the third voltage is smaller than or equal to the source-drain breakdown voltage of the second control transistor, and the voltage difference between the second voltage and the fourth voltage is smaller than or equal to the source-drain breakdown voltage of the first control transistor.

11 Claims, 12 Drawing Sheets

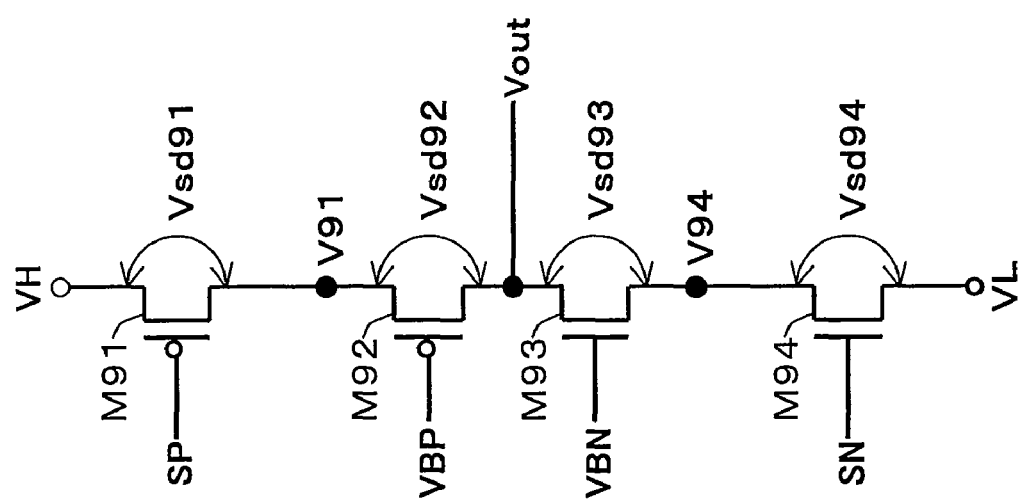
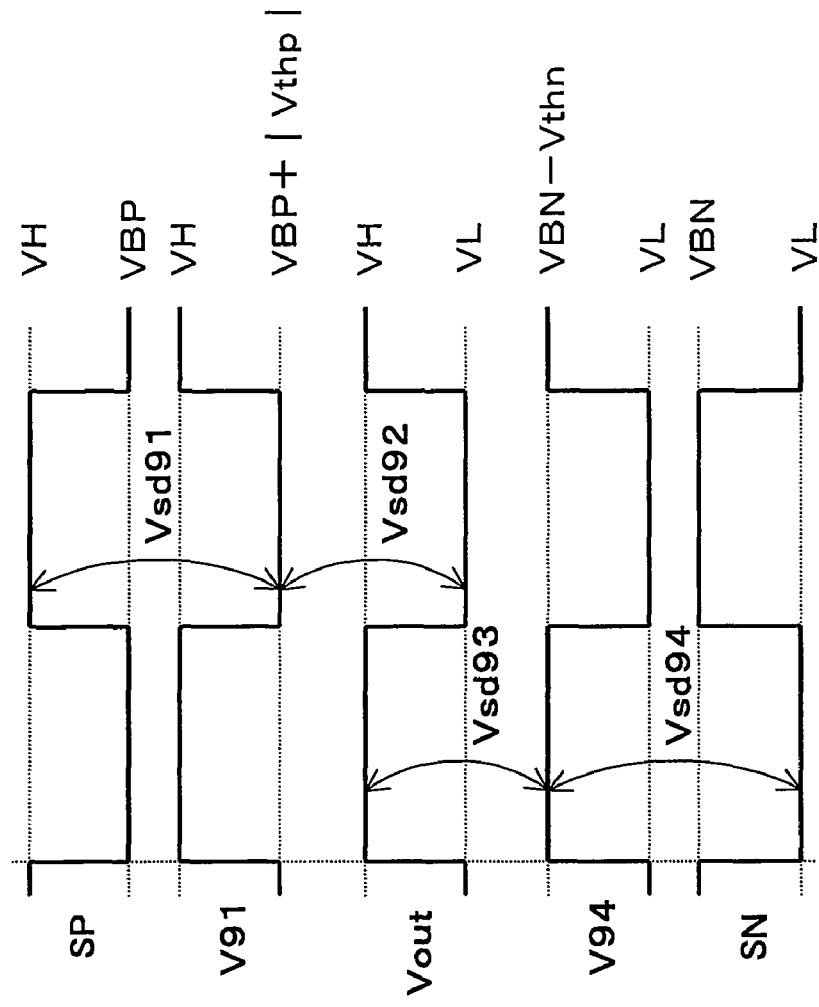
FIG.12B
FIG.12A

DRIVE CIRCUIT, VOLTAGE CONVERSION DEVICE AND AUDIO SYSTEM

BACKGROUND OF THE INVENTION

The present invention relates to a drive circuit for generating an output signal having an amplitude greater than the breakdown voltage of its element, and more particularly, to a drive circuit for outputting a control signal for controlling voltage boosting operation in a voltage conversion device that boosts an input voltage to output a boosted output voltage.

In recent years, in communication systems such as cellular phones, efforts toward thinner cabinets are actively going on. In this relation, in place of dynamic speakers conventionally used widely as speakers for sound reproduction, thin piezoelectric speakers have been increasingly adopted. To drive a piezoelectric speaker, a differential voltage amplitude of about 13 Vpp is generally necessary. Hence, a voltage of about 7V to 10V is supplied to an amplifier for driving the piezoelectric speaker as the power supply voltage. Portable equipment such as cellular phones generally uses a lithium-ion battery that outputs a voltage of about 4V. To use the output voltage of the lithium-ion battery as the power supply voltage for the amplifier for driving the piezoelectric speaker, therefore, the output voltage of the lithium-ion battery must be boosted about twofold. For this purpose, a charge-pump power supply device is provided which can be implemented with a comparatively simple configuration. Such a charge-pump power supply device is used, not only for cellular phones, but also in various technical fields.

FIG. 11 shows a configuration of a conventional charge-pump power supply device. This conventional charge-pump power supply device switches the connection states of a booster capacitance C91, an input node Nin for receiving an input voltage VC (power supply voltage, for example), a reference node Nref for receiving a reference voltage VL (ground voltage, for example) and an output node Nout for outputting an output voltage VH, by means of drive transistors T91 to T94, to thereby boost the input voltage VC and output the boosted output voltage VH. Referring to FIG. 11, first, at start of a charging mode, the transistors T91 and T92 are turned ON while the transistors T93 and T94 are turned OFF. This results in formation of a charging path as shown in FIG. 11, permitting charge corresponding to the voltage difference between the input voltage VC and the reference voltage VL to be stored in the booster capacitance C91. Thereafter, at start of a boosting mode, the drive transistors T93 and T94 are turned ON while the drive lo transistors T91 and T92 are turned OFF. This results in formation of a boosting path as shown in FIG. 11, permitting output of the output voltage VH ($VH=2\times(VC-VL)$). In this way, the output voltage VH having a voltage value twice as large as the input voltage VC is outputted.

In FIG. 11, to turn ON the drive transistor T91, the reference voltage VL must be applied to the gate of the drive transistor T91. Contrarily, to turn OFF the drive transistor T91, the output voltage VH must be applied to the gate of the drive transistor T91. In other words, a control signal swinging between the output voltage VH and the reference voltage VL must be supplied to the gate of the drive transistor T91. Hence, a drive circuit for supplying such a control signal to the drive transistor T91, which operates using the output voltage VH and the reference voltage VL as its power supply voltages, must be configured to have a breakdown voltage higher than other drive circuits for supplying control signals to the other drive transistors T92, T93 and T94. To increase the breakdown voltage, however, a process step for increasing the breakdown voltage must be added to the fabrication process. Also, the circuit area will increase by increasing the breakdown voltage.

To solve the above problem, Japanese Laid-Open Patent Publication No. 2001-127615 (Patent Document 1) discloses a buffer circuit operating with a power supply voltage higher than the breakdown voltage of its element. FIG. 12A shows a configuration of the buffer circuit disclosed in Patent Document 1. A transistor M92, receiving a bias voltage VBP at its gate, controls an intermediate voltage V91 (drain voltage of a transistor M91) so as not to be lower than "VBP+|Vthp|". Likewise, a transistor M93, receiving a bias voltage VBN at its gate, controls an intermediate voltage V94 (drain voltage of a transistor M94) so as not to be higher than "VBN−Vthn". Note that "|Vthp|" and "Vthn" are respectively threshold voltages of the transistors M92 and M93. When this buffer circuit is used as a drive circuit for a charge-pump power supply device, the output voltage VH and the reference voltage VL of the charge-pump power supply device are supplied to the buffer circuit as power supply voltages as shown in FIG. 12A.

The operation of the buffer circuit shown in FIG. 12A will be described with reference to FIG. 12B. When input signals SP and SN become low (VBP and VL, respectively), the transistor M91 is turned ON while the transistor M94 is turned OFF. Hence, the output voltage Vout becomes high (VH). Also, the intermediate voltages V91 and V94 respectively become "VH" and "VBN−Vthn". Contrarily, when the input signals SP and SN become high (VH and VBN, respectively), the transistor M91 is turned OFF while the transistor M94 is turned ON. Hence, the output voltage Vout becomes low (VL). Also, the intermediate voltages V91 and V94 respectively become "VBP+|Vthp|" and "VL".

The maximum values of the source-drain voltages Vsd91 to Vsd94 of the transistors M91 to M94 are respectively expressed as follows.

$$Vsd91 = VH - (VBP + |Vthp|) \quad (1)$$

$$Vsd92 = (VBP + |Vthp|) - VL \quad (2)$$

$$Vsd93 = VH - (VBN - Vthn) \quad (3)$$

$$Vsd94 = (VBN - Vthn) - VL \quad (4)$$

As long as these source-drain voltages Vsd91 to Vsd94 do not exceed the corresponding source-drain breakdown voltages of the transistors M91 to M94, the buffer circuit shown in FIG. 12A can output the output voltage Vout having a value higher than the source-drain breakdown voltages of the transistors M91 to M94.

However, in the buffer transistor shown in FIG. 12A, the bias voltages VBP and VBN and the amplitude of the output voltage Vout of the buffer circuit must be set considering, not only the source-drain breakdown voltages of the transistors M91 to M94, but also the threshold voltages "|Vthp|" and "Vthn" of the transistors M92 and M93. In particular, when such a buffer circuit is used as a drive circuit for a charge-pump power supply device, the amplitude of a control signal for a drive transistor will be restricted. As a result, the voltage value of the output voltage of the charge-pump power supply device will be restricted.

For example, assume that the source-drain breakdown voltages of the transistors M91 to M94 are all "Vabs" and that "|Vthp|=Vthn=Vth". Assume also that "VBP=VBN=VB= (VH−VL)/2" because it is inefficient to set the bias voltages VBP and VBN separately. In this case, the above expressions (1) to (4) will be changed to the following.

Expression (1)→$Vsd91=VH-(VB+Vth)$ (1')

Expression (2)→$Vsd92=(VB+Vth)-VL$ (2')

Expression (3)→$Vsd93=VH-(VB-Vth)$ (3')

Expression (4)→$Vsd94=(VB-Vth)-VL$ (4')

When "VL=0" is set for simplification, "VH=2×VB" will be satisfied. The above expressions (1') to (4') will then be changed to the following.

Expression (1')→$Vsd91=VB-Vth$ (1")

Expression (2')→$Vsd92=VB+Vth$ (2")

Expression (3')→$Vsd93=VB+Vth$ (3")

Expression (4')→$Vsd94=VB-Vth$ (4")

From the above expressions (1") to (4"), it is found that the maximum value of the source-drain voltages is "VB+Vth". In the buffer circuit shown in FIG. 12A, the amplitude of the output voltage Vout will be largest when the maximum source-drain voltage value "VB+Vth" is equal to the source-drain breakdown voltage "Vabs". That is, the amplitude of the output voltage Vout will be largest when the following expression (5) is satisfied.

$$VB+Vth=Vabs \rightarrow VB=Vabs-Vth \quad (5)$$

Since "VH=2×VB", "VH=2×(Vabs−Vth)" will be satisfied. This indicates that the voltage VH supplied to the buffer circuit as a power supply voltage must be set considering, not only the source-drain breakdown voltages of the transistors M91 to M94, but also the threshold voltages of the transistors M92 and M93.

Also, assuming that the source-drain breakdown voltages of the drive transistors T91 to T94 shown in FIG. 11 are "Vabs", the maximum output voltage of the charge-pump power supply device will be "2×Vabs". However, when the control signal for the drive transistor T91 is generated by the buffer circuit shown in FIG. 12A, the output voltage of the charge-pump power supply device must be lower than "2 (Vabs−Vth)". For example, assume that "Vabs=5.0 [v]" and "Vth=0.7 [v]". In this case, the maximum value of the output voltage the charge-pump power supply device can output is "10.0 [v]". To use the buffer circuit shown in FIG. 12A as the drive circuit, however, the maximum value of the output voltage of the charge-pump power supply device must be made lower than "8.6 [v]". Thus, the voltage value of the output voltage of the charge-pump power supply device is restricted.

SUMMARY OF THE INVENTION

An object of the present invention is providing a drive circuit capable of setting the amplitude of its output signal without being restricted by the threshold voltage of its element while preventing breakdown of the element. More specifically, an object of the present invention is providing a voltage conversion device for boosting an input voltage to output a boosted output voltage in which the amplitude of a control signal for a drive transistor can be set without being restricted by the threshold voltage of an element constituting a drive circuit.

According to one aspect of the present invention, the voltage conversion device is a device for boosting an input voltage to output a boosted output voltage, the device including: a booster circuit; and a control circuit for controlling operation of the booster circuit, wherein the booster circuit includes: a booster capacitance; an output capacitance connected between an output node for outputting the output voltage and a reference node for receiving a reference voltage; and a connection switch section for connecting one terminal of the booster capacitance to an input node for receiving the input voltage and the other terminal of the booster capacitance to the reference node in a charging mode, and connecting the other terminal of the booster capacitance to the input node and the one terminal of the booster capacitance to the output node in a boosting mode, the connection switch section includes a first drive transistor for switching the connection between the input node and the one terminal of the booster capacitance in response to a first control signal swinging between the output voltage and the reference voltage, the control circuit includes: a first control transistor connected between a first input node for receiving a first input signal swinging between the output voltage and a first bias voltage and an intermediate node for outputting the first control signal, the first control transistor receiving the first bias voltage at its gate; and a second control transistor connected between a second input node for receiving a second input signal swinging between a second bias voltage and the reference voltage in synchronization with the first input signal and the intermediate node, the second control transistor receiving the second bias voltage at its gate, the voltage difference between the output voltage and the second bias voltage is smaller than or equal to a source-drain breakdown voltage of the second control transistor, and the voltage difference between the first bias voltage and the reference voltage is smaller than or equal to a source-drain breakdown voltage of the first control transistor.

In the voltage conversion device described above, when the voltage level of the first input signal is equal to the output voltage, the voltage level of the second input signal is equal to the second bias voltage. At this time, the first control transistor is ON, making the voltage level of the first control signal equal to the output voltage. Also, the source-drain voltage of the second control transistor corresponds to the voltage difference between the output voltage and the second bias voltage. Contrarily, when the voltage level of the first input signal is equal to the first bias voltage, the voltage level of the second input signal is equal to the reference voltage. At this time, the second control transistor is ON, making the voltage level of the first control signal equal to the reference voltage. Also, the source-drain voltage of the first control transistor corresponds to the voltage difference between the first bias voltage and the reference voltage. In this way, since the first control signal is free from restrictions of the threshold voltages of the first and second control transistors, the voltage value of the output voltage can be set without being restricted by the threshold voltages of the first and second control transistors. Moreover, since the source-drain voltages of the first and second control transistors do not exceed the respective source-drain breakdown voltages, the first and second control transistors can be prevented from breakdown.

Preferably, the connection switch section further includes: a second drive transistor for switching the connection between the other terminal of the booster capacitance and the reference node in response to a second control signal swinging between the input voltage and the reference voltage; a third drive transistor for switching the connection between the other terminal of the booster capacitance and the input node in response to a third control signal swinging between the input voltage and the reference voltage; and a fourth drive transistor for switching the connection between the one terminal of the booster capacitance and the output node in response to a fourth control signal swinging between the output voltage and the first bias voltage, and the control circuit further includes: a signal generation section for generating first and second reference signals swinging between the input voltage and the reference voltage complementarily to each other, the second control signal and the third control signal; a first level shifter receiving the output voltage and the first bias voltage for shifting the first reference signal generated by the signal generation section to the first input signal; and a second level shifter receiving the output voltage and the first bias voltage for shifting the second reference signal generated by the signal generation section to the fourth control signal.

Preferably, the voltage conversion device further includes a voltage generation section for generating the first bias voltage based on the output voltage so that the first bias voltage varies with a variation of the output voltage.

In the voltage conversion device described above, it is possible to secure a gate-source voltage required to turn ON the fourth drive transistor at the start of drive of the booster circuit.

According to another aspect of the present invention, the drive circuit includes: a first control transistor connected between a first input node for receiving a first input signal swinging between a first voltage and a second voltage and an intermediate node for outputting an output signal, the first control transistor receiving the second voltage at its gate; and a second control transistor connected between a second input node for receiving a second input signal swinging between a third voltage and a fourth voltage in synchronization with the first input signal and the intermediate node, the second control transistor receiving the third voltage at its node, wherein the voltage difference between the first voltage and the third voltage is smaller than or equal to a source-drain breakdown voltage of the second control transistor, and the voltage difference between the second voltage and the fourth voltage is smaller than or equal to a source-drain breakdown voltage of the first control transistor.

In the drive circuit described above, the amplitude of the output signal can be set without being restricted by the threshold voltages of the first and second control transistors. Also, since the source-drain voltages of the first and second control transistors do not exceed their source-drain breakdown voltages, the first and second control transistors are prevented from breakdown.

BRIEF DESCRIPTION OF THE DRAWINGS

FIG. 12A is a view showing a configuration of a conventional buffer circuit.

FIG. 12B is a signal waveform diagram presented to describe the operation of the conventional buffer circuit.

DESCRIPTION OF THE PREFERRED EMBODIMENTS

Figure 1:
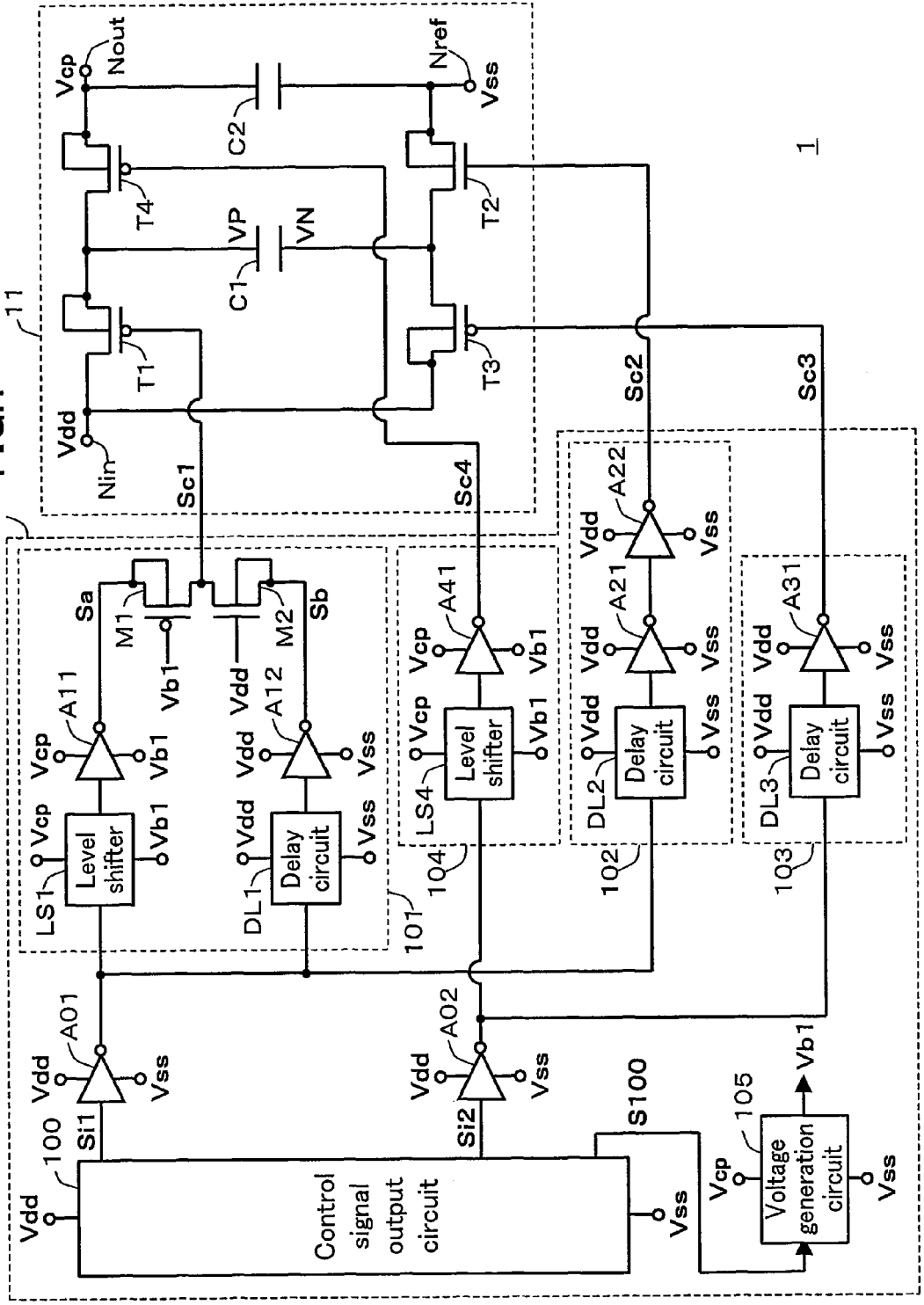
FIG. 1 is a view showing a configuration of a voltage conversion device of Embodiment 1 of the present invention.

Hereinafter, preferred embodiments of the present invention will be described in detail with reference to the accompanying drawings. In the drawings, identical or equivalent components are denoted by the same reference numerals, and description thereof is not repeated.

Embodiment 1

FIG. 1 shows a configuration of a voltage conversion device of Embodiment 1 of the present invention. The voltage conversion device 1, which boosts an input voltage (power supply voltage Vdd in the illustrated example) to output a boosted output voltage Vcp, includes a booster circuit 11 and a control circuit 12.

The booster circuit 11 includes a booster capacitance C1, an output capacitance C2 and drive transistors T1 to T4. The output capacitance C2 is connected between an output node Nout and a reference node Nref to which a reference voltage (ground voltage Vss in the illustrated example) is supplied. The drive transistor T1, connected between an input node Nin and one terminal of the booster capacitance C1, receives a control signal Sc1 at its gate. The input voltage (power supply voltage Vdd in the illustrated example) is supplied to the input node Nin. The drive transistor T2, connected between the other terminal of the booster capacitance C1 and the reference node Nref, receives a control signal Sc2 at its gate. The drive transistor T3, connected between the input node Nin and the other terminal of the booster capacitance C1, receives a control signal Sc3 at its gate. The drive transistor T4, connected between the one terminal of the booster capacitance C1 and the output node Nout, receives a control signal Sc4 at its gate.

The control circuit 12, which controls the operation of the booster circuit 11, includes a control signal output circuit 100, drive circuits 101 to 104 and a voltage generation circuit 105.

The control signal output circuit 100 receives the power supply voltage Vdd and the ground voltage Vss as power supply voltages and outputs reference signals Si1 and Si2 that swing between the power supply voltage Vdd and the ground voltage Vss complementarily to each other. The control signal output circuit 100 also activates a stop signal S100 in response to an instruction of drive stop from outside. The control signal output circuit 100 is composed of an oscillator, a delay circuit, a stop control circuit and the like, for example.

The drive circuit 101 receives the reference signal Si1 from the control signal output circuit 100 via an inverter circuit A01 and outputs a control signal Sc1 swinging between the output voltage Vcp and the ground voltage Vss. The drive circuit 101 includes a level shifter LS1, a delay circuit DL1, inverter circuits A11 and A12 and control transistors M1 and M2.

The drive circuit 102 receives the reference signal Si1 from the control signal output circuit 100 via the inverter circuit A01 and outputs a control signal Sc2 swinging between the power supply voltage Vdd and the ground voltage Vss. The drive circuit 102 includes a delay circuit DL2 and inverter circuits A21 and A22.

The drive circuit 103 receives the reference signal Si2 from the control signal output circuit 100 via an inverter circuit A02 and outputs a control signal Sc3 swinging between the power supply voltage Vdd and the ground voltage Vss. The drive circuit 103 includes a delay circuit DL3 and an inverter circuit A31.

The drive circuit 104 receives the reference signal Si2 from the control signal output circuit 100 via the inverter circuit A02 and outputs a control signal Sc4 swinging between the output voltage Vcp and a bias voltage Vb1. The drive circuit 104 includes a level shifter LS4 and an inverter circuit A41.

Figure 2:
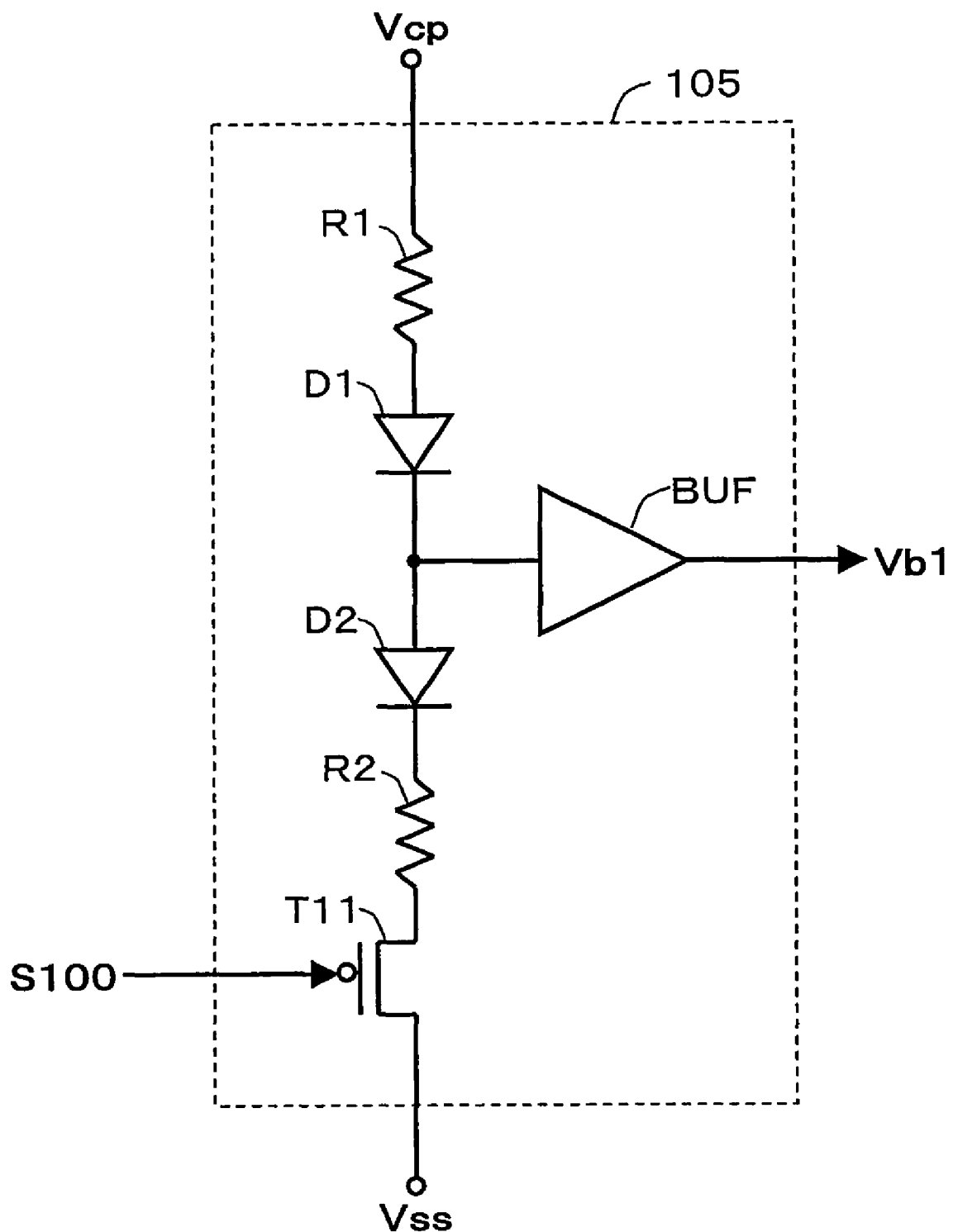
FIG. 2 is a view showing an exemplary configuration of a voltage generation circuit in FIG. 1.
Figure 3:
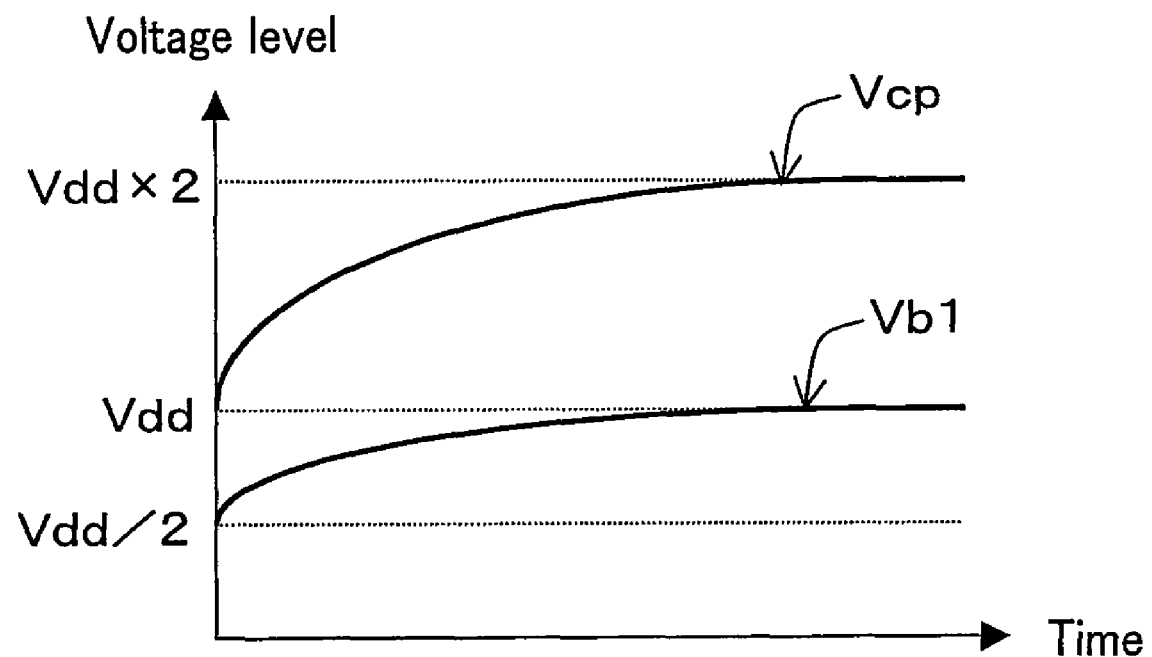
FIG. 3 is a graph presented to describe a bias voltage.

The voltage generation circuit 105 outputs the bias voltage Vb1. The voltage generation circuit 105 also stops the output of the bias voltage Vb1 once the stop signal S100 from the control signal output circuit 100 is activated. As shown in FIG. 2, the voltage generation circuit 105 includes resistances R1 and R2, diodes D1 and D2 and a buffer BUF, for example. In the voltage generation circuit 105, a voltage obtained by resistance division with the resistances R1 and R2 is outputted as the bias voltage Vb1. Having the configuration described above, the voltage generation circuit 105 can make the bias voltage Vb1 vary with the variation of the output voltage Vcp, as shown in FIG. 3, and thus monotonously increase at the time of start of drive of the booster circuit 11. The voltage generation circuit 105 also includes a transistor T11 that receives the stop signal S100 at its gate. When the stop signal S100 is inactive (low in the illustrated example), the transistor T11 is ON, allowing output of the bias voltage Vb1. Once the stop signal S100 becomes active (high in the illustrated example), the output of the bias voltage Vb1 is stopped.

Figure 4A:
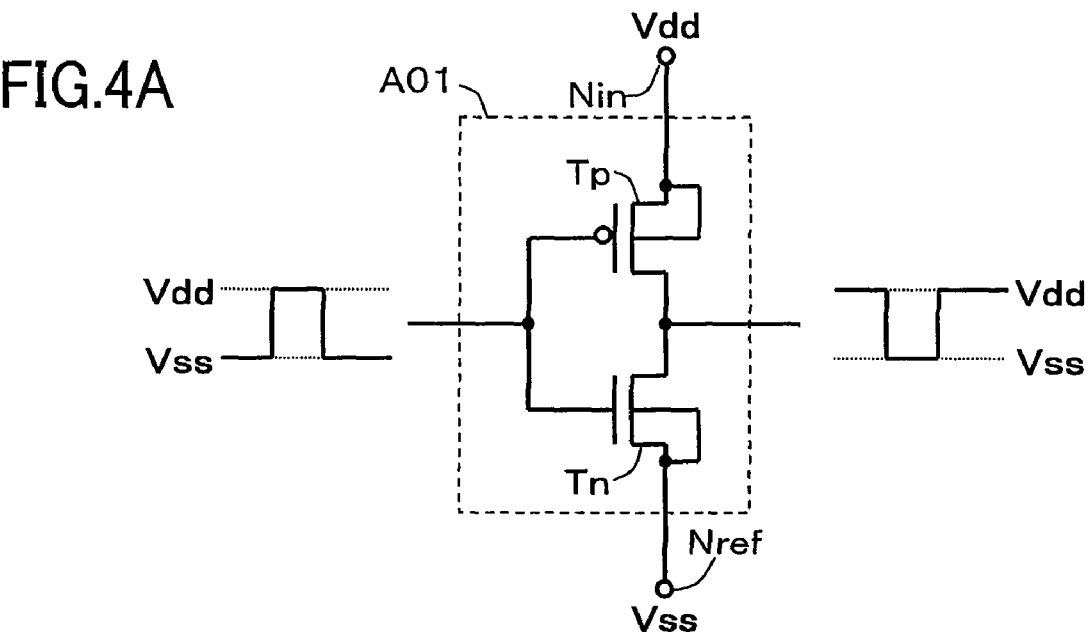
FIGS. 4A and 4B are views showing exemplary configurations of inverter circuits in FIG. 1.
Figure 4B:
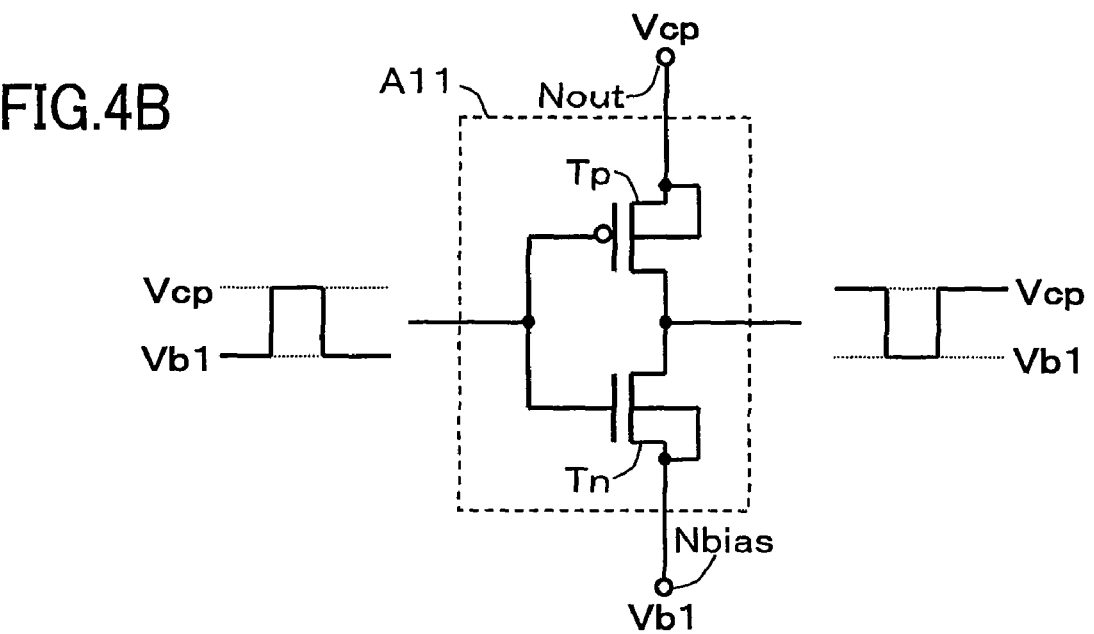

The inverter circuits A01, A02, A12, A21, A22 and A31 and the delay circuits DL1, DL2 and DL3 receive the power supply voltage Vdd and the reference voltage Vss as their power supply voltages. For example, as shown in FIG. 4A, the inverter circuit A01 includes transistors Tp and Tn connected between the input node Nin and the reference node Nref. The level shifters LS1 and LS4 and the inverter circuits A11 and A41 receive the output voltage Vcp and the bias voltage Vb1 as their power supply voltages. For example, as shown in FIG. 4B, although the inverter circuit A11 has substantially the same configuration as the inverter circuit A01, the sources of the transistors Tp and Tn are respectively connected to the output node Nout receiving the output voltage Vcp and a bias node Nbias receiving the bias voltage Vb1.

The delay circuit DL1 delays the reference signal Si1 and outputs the delayed signal as an input signal Sb so that the input signal Sb is synchronized with an input signal Sa. The delay circuits DL2 and DL3 respectively delay the reference signals Si1 and Si2 and output the delayed signals as the control signals Sc2 and Sc3 so that the delay amounts in the drive circuits 101 to 104 are the same.

The inverter circuits A01 and A02 are respectively provided to amplify the reference signals Si1 and Si2 from the control signal output circuit 100. The inverter circuits A11 and A12 are respectively provided to amplify the input signals Sa and Sb and also make the input signals Sa and Sb identical in polarity to the reference signal Si1. The inverter circuits A21 and A22 are provided to amplify the control signal Sc2 and also make the control signal Sc2 opposite in polarity to the reference signal Si1. The inverter circuits A31 and A41 are respectively provided to amplify the control signals Sc3 and Sc4 and also make the control signals Sc3 and Sc4 identical in polarity to the reference signal Si2.

Figure 5:
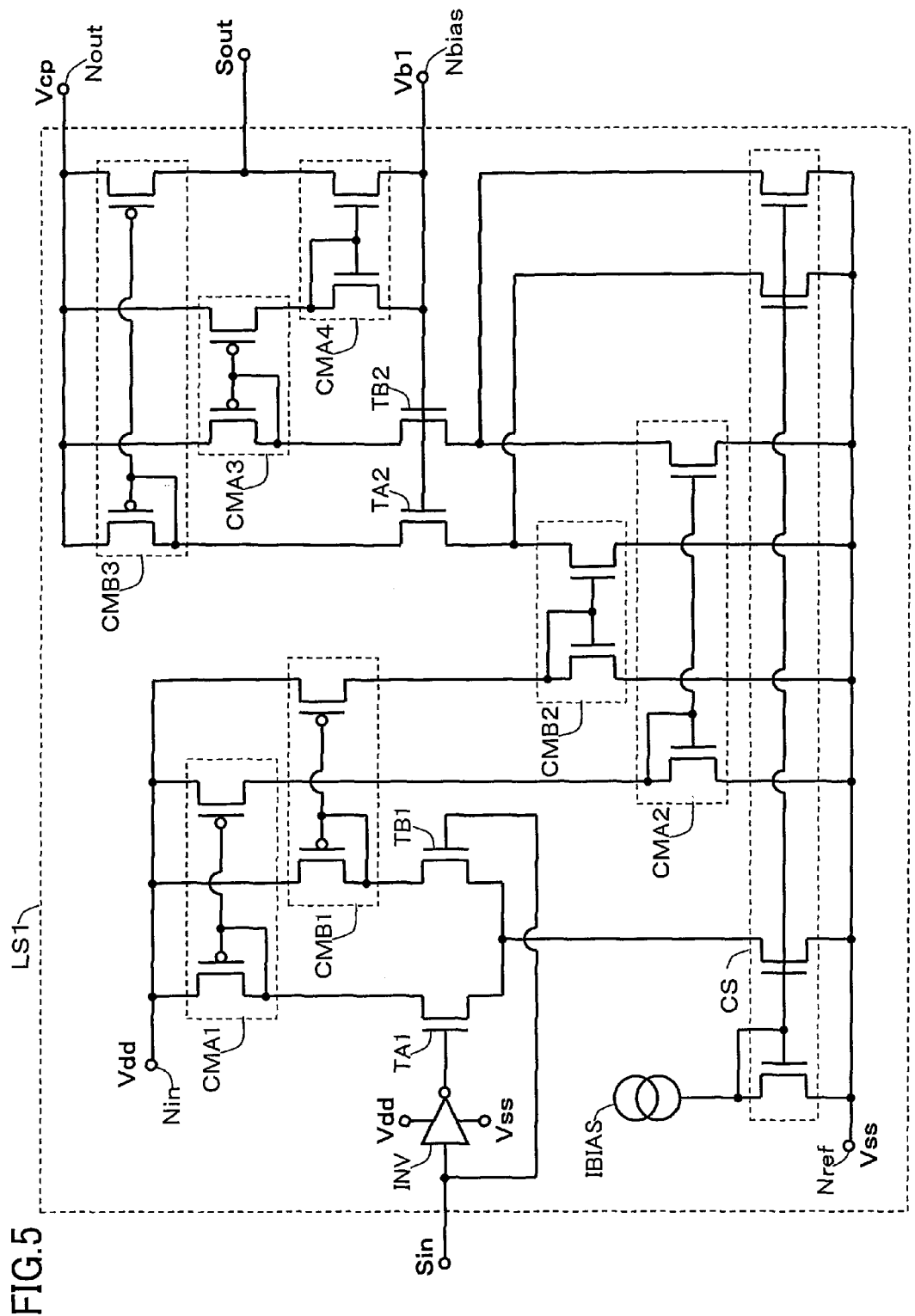
FIG. 5 is a view showing an exemplary configuration of a level shifter in FIG. 1.

The level shifters LS1 and LS4 are respectively provided to shift the reference signals Si1 and Si2 to the input signal Sa and the control signal Sc4. For example, as shown in FIG. 5, the level shifter LS1 includes an inverter circuit INV, a differential transistor pair (TA1 and TB1), current mirror circuits CMA1, CMA2, CMA3, CMA4, CMB1, CMB2 and CMB3, transistors TA2 and TB2, a bias current source IBIAS and a current supply section CS. The current supply section CS supplies a current to the differential transistor pair TA1 and TB1 and the transistors TA2 and TB2. With the idling current flowing from the current supply section CS to the transistors TA2 and TB2, the source voltages of the transistors TA2 and TB2 are suppressed from becoming higher than the bias voltage Vb1.

The control transistor M1 has a source connected to the output terminal of the inverter circuit A11, a drain connected to the drain of the control transistor M2, and a gate receiving the bias voltage Vb1. The control transistor M2 has a source connected to the output terminal of the inverter circuit A12 and a gate receiving a bias voltage (power supply voltage Vdd in the illustrated example). The control signal Sc1 is outputted from the connection node (intermediate node) of the control transistors M1 and M2.

Figure 6:
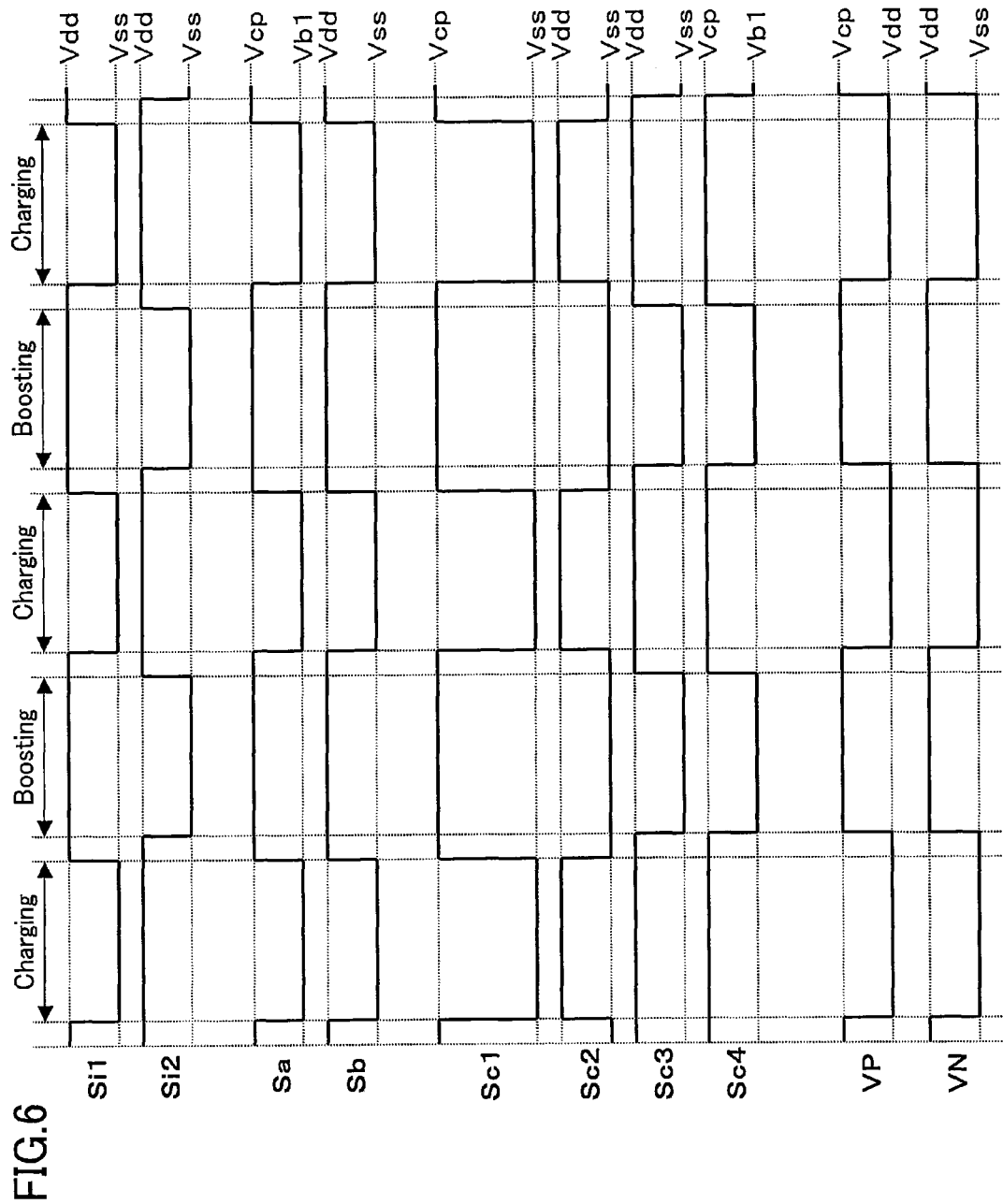
FIG. 6 is a signal waveform diagram presented to describe the operation of the voltage conversion device of FIG. 1.

Next, referring to FIG. 6, the operation of the voltage conversion device of FIG. 1 will be described. It is herein assumed that the source-drain breakdown voltages of the drive transistors T1 to T4 and the control transistors M1 and M2 are all "Vdd" and that "Vcp=2×Vdd". It is also assumed that "Vb1=Vcp/2".

[Charging Period]

First, at the start of a charging period (when the device is put in a charging mode), in the control circuit 12, the reference signal Si1 shifts from high (Vdd) to low (Vss), while the reference signal Si2 remains high (Vdd).

In the drive circuit 101, the input signal Sa shifts from high (Vcp) to low (Vb1), and the input signal Sb also shifts from high (Vdd) to low (Vss). This turns ON the control transistor M2, and thus the control signal Sc1 becomes low (Vss) from high (Vcp). At this time, the source-drain voltages of the control transistors M1 and M2 are respectively "Vb1−Vss" and "0" both of which are lower than the source-drain breakdown voltage "Vdd".

In the booster circuit 101, with the control signal Sc1 shifting from high (Vcp) to low (Vss), the drive transistor T1 becomes ON from OFF. Also, since the control signal Sc2 shifts from low (Vss) to high (Vdd), the drive transistor T2 becomes ON from OFF. Hence, the one terminal of the booster capacitance C1 is connected to the input node Nin while the other terminal thereof is connected to the reference node Nref, whereby the booster capacitance C1 is charged.

[Non-Drive Period]

Upon termination of the charging period (when the charging mode is terminated), in the control circuit 12, the reference signal Si1 shifts from low (Vss) to high (Vdd), while the reference signal Si2 remains high (Vdd).

In the drive circuit 101, the input signal Sa shifts from low (Vb1) to high (Vcp), and the input signal Sb also shifts from low (Vss) to high (Vdd). This turns ON the control transistor M1, and thus the control signal Sc1 becomes high (Vcp). At this time, the source-drain voltages of the control transistors M1 and M2 are respectively "0" and "Vcp−Vdd" both of which are lower than the source-drain breakdown voltage "Vdd".

In the booster circuit 11, with the control signal Sc1 shifting from low (Vss) to high (Vcp), the drive transistor T1 becomes OFF from ON. Also, since the control signal Sc2 shifts from high (Vdd) to low (Vss), the drive transistor T2 becomes OFF from ON. Hence, the one terminal of the booster capacitance C1 is disconnected from both the input node Nin and the output node Nout, while the other terminal thereof is disconnected from both the input node Nin and the reference node Nref. The booster circuit 11 is therefore in a non-drive state.

[Boosting Period]

At the start of a boosting period (when the device is put in a boosting mode), in the control circuit 12, the reference signal Si2 shifts from high (Vdd) to low (Vss), while the reference signal Si1 remains high (Vdd). At this time, the source-drain voltages of the control transistors M1 and M2 are respectively "0" and "Vcp−Vdd" both of which are lower than the source-drain breakdown voltage "Vdd".

In the booster circuit 11, since the control signals Sc3 and Sc4 shift from high (Vdd and Vcp, respectively) to low (Vss and Vb1, respectively), the drive transistors T3 and T4 become ON from OFF. Hence, the one terminal of the booster capacitance C1 is connected to the output node Nout while the other terminal thereof is connected to the input node Nin. The charged voltage at the booster capacitance C1 is therefore superimposed on the power supply voltage Vdd, to allow output of the output voltage Vcp having a voltage value twice as large as the power supply voltage Vdd.

As described above, since the source-drain voltages of the control transistors M1 and M2 do not exceed the source-drain breakdown voltage, the control transistors M1 and M2 are prevented from breakdown. Also, the amplitude of the control signal Sc1 can be set without being restricted by the threshold voltages of the control transistors M1 and M2. In this way, with the amplitude of the control signal Sc1 being free from restrictions of the threshold voltages of the control transistors M1 and M2, the output voltage Vcp having a voltage value twice as large as the source-drain breakdown voltage of the drive transistors T1 to T4 can be outputted. In other words, since the voltage value of the output voltage can be set without being restricted by the threshold voltages of the control transistors M1 and M2, the booster circuit 11 can make full use of its boosting capability.

Also, since the bias voltage Vb1 varies with a variation of the output voltage Vcp. the low level of the control signal Sc4 can be made lower than the power supply voltage Vdd at the start of drive of the booster circuit 11 (more specifically, when the boosting operation is started from the state where no charge is stored in the output capacitance C2). This makes it possible to secure the gate-source voltage required to turn ON the drive transistor T4 at the start of drive of the booster circuit 11. The bias voltage Vb1 may otherwise be a constant voltage.

Moreover, since being controllable with the stop signal S100, the voltage generation circuit 105 can be driven only when the bias voltage Vb1 is necessary. This can save power that may otherwise be wasted by the voltage generation circuit 105.

Furthermore, by adjusting the delay amounts with the delay circuits DL1, DL2 and DL3, the non-operation period (period between the charging period and the boosting period) can be secured. This can suppress occurrence of a through current that may be caused by overlap of the charging period with the boosting period (i.e., the state where the drive transistors T1 to T4 are all ON)

Alteration to Embodiment 1

Figure 7:
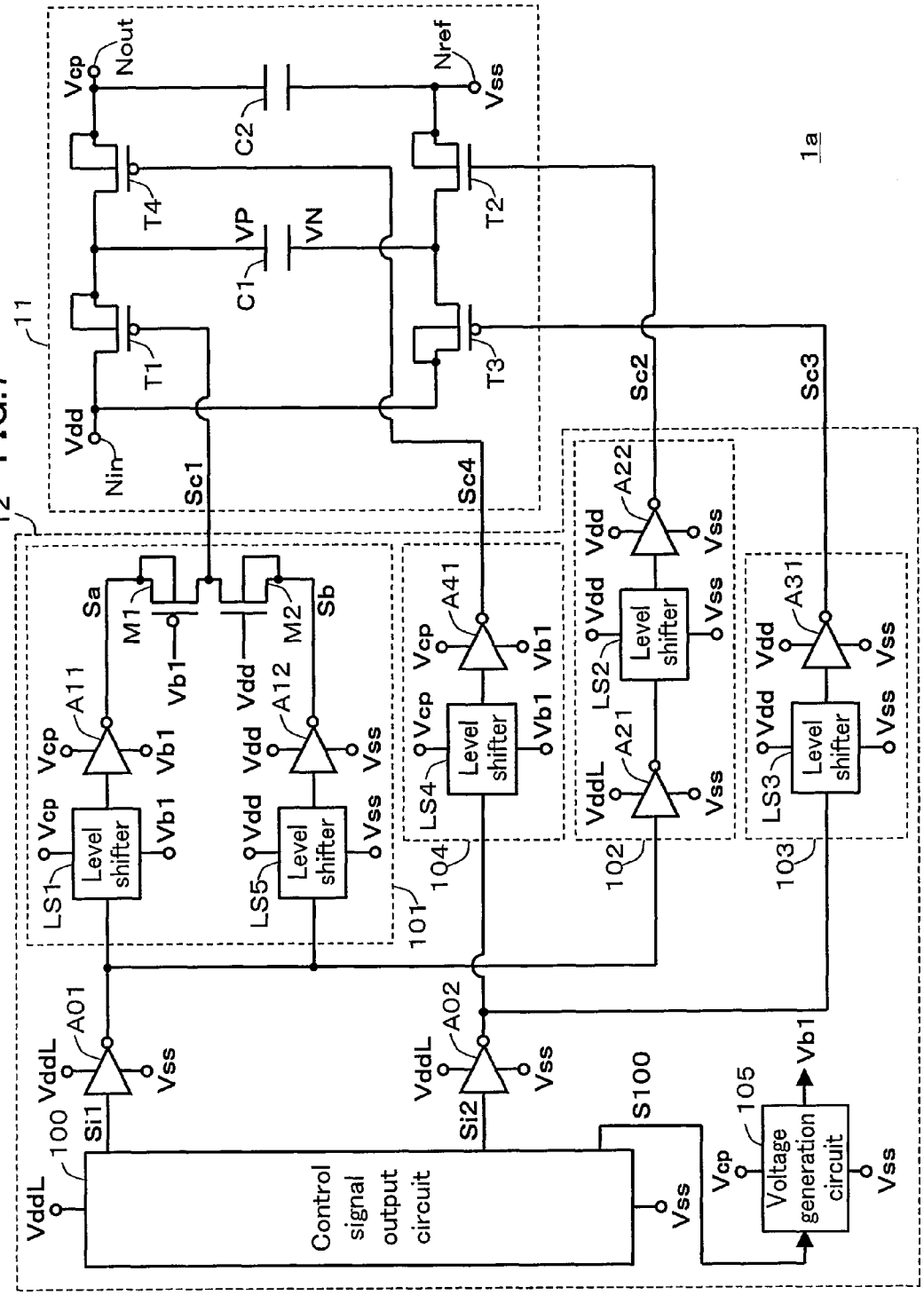
FIG. 7 is a view showing an alteration to the voltage conversion device of FIG. 1.

FIG. 7 shows a configuration of a voltage conversion device 1a of an alteration to Embodiment 1 of the present invention. As shown in FIG. 7, in place of the power supply voltage Vdd, a voltage VddL (voltage lower than the power supply voltage Vdd) is supplied to the control signal output circuit 100 and the inverter circuits A01 and A02 as a power supply voltage. In this case, by providing level shifters LS5, LS2 and LS3 in place of the delay circuits DL1, DL2 and DL3, respectively, control signals Sc1 to Sc4 as those in FIG. 1 can be generated. This configuration can reduce the power consumed by the control signal output circuit 100 and the inverter circuits A01 and A02. Also, by placing the inverter circuit A21 upstream of the level shifter LS2 in the drive circuit 102 as shown in FIG. 7, the voltage VddL can be supplied to the inverter circuit A21, also, as a power supply voltage, to thereby further reduce the power consumption.

Embodiment 2

Figure 8:
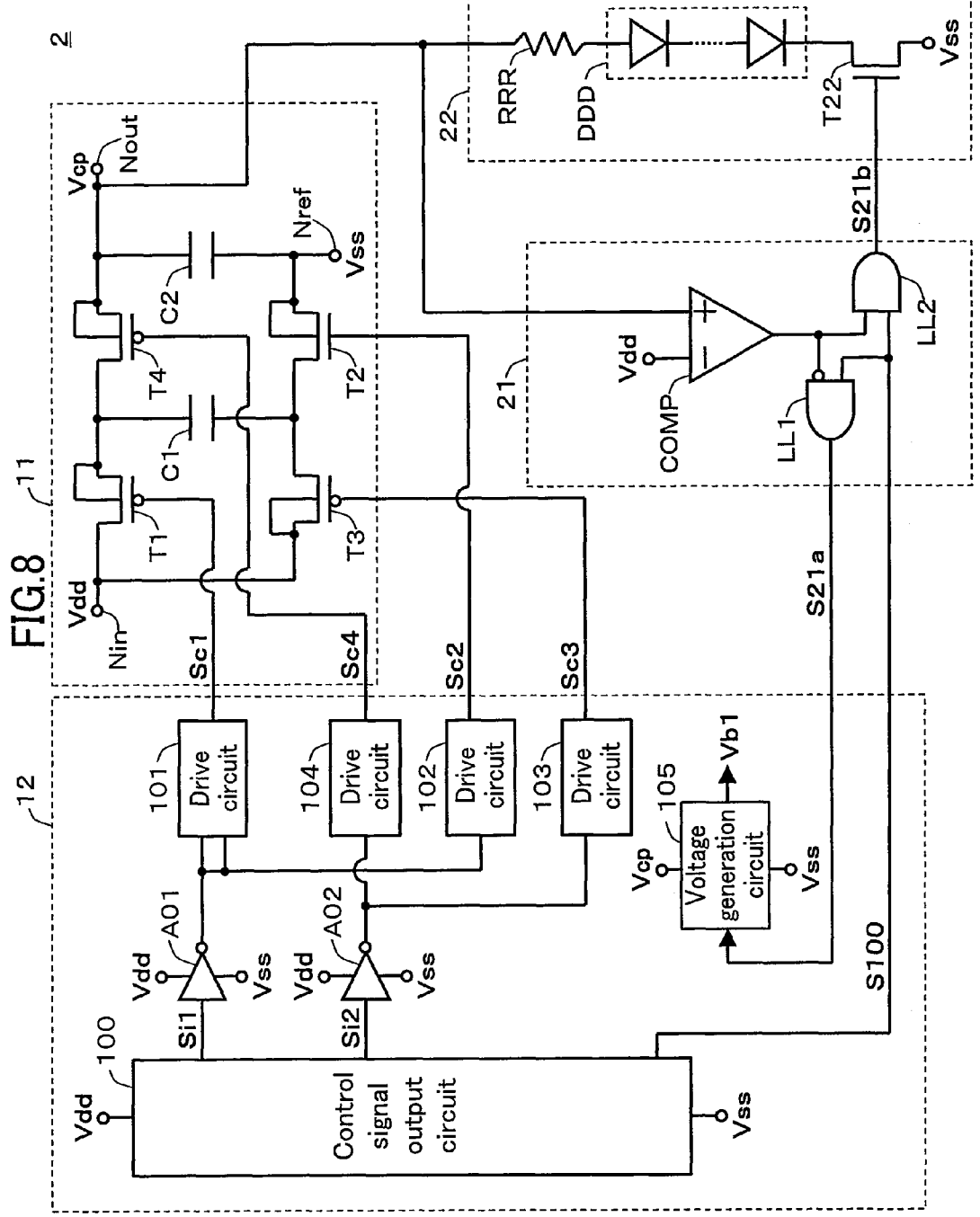
FIG. 8 is a view showing a configuration of a voltage conversion device of Embodiment 2 of the present invention.

FIG. 8 shows a configuration of a voltage conversion device 2 of Embodiment 2 of the present invention. The voltage conversion device 2 includes a determination circuit 21 and a reset circuit 22 in addition to the components shown in FIG. 1.

The determination circuit 21 receives the output voltage Vcp and determines whether or not the output voltage Vcp is higher than a predetermined value (the power supply voltage Vdd in the illustrated example). The determination circuit 21 also receives the stop signal S100 from the control signal output circuit 100 and determines whether or not the stop signal S100 is active. The determination circuit 21 activates a stop signal S21a if determining that the voltage value of the output voltage Vcp is lower than the predetermined value and that the stop signal S100 is active. Otherwise (i.e., when the voltage value of the output voltage Vcp is higher than the predetermined value and/or the stop signal S100 is inactive), the determination circuit 21 inactivates the stop signal S21a.

Also, the determination circuit 21 activates a reset signal S21b if determining that the voltage value of the output voltage Vcp is higher than the predetermined value and that the stop signal S100 is active. Otherwise (i.e., when the voltage value of the output voltage Vcp is lower than the predetermined value and/or the stop signal S100 is inactive), the determination circuit 21 inactivates the reset signal S21b. The determination circuit 21 includes a comparator COMP for comparing the output voltage Vcp with the power supply voltage Vdd and logic circuits LL1 and LL2 that receive the output of the comparator COMP and the stop signal S100, for example.

The voltage generation circuit 105 receives the stop signal S21a from the determination circuit 21 in place of the stop signal S100, and continues outputting the bias voltage Vb1 if the stop signal S21a is inactive (low in the illustrated example) or stops outputting the bias voltage Vb1 if the stop signal S21a becomes active (high in the illustrated example). In other words, when the stop signal S100 is active, the voltage generation circuit 105 continues outputting the bias voltage Vb1 if the voltage value of the output voltage Vcp is higher than a predetermined value, or stops outputting the bias voltage Vb1 if it is lower than the predetermined value.

The reset circuit 22 discharges the charge stored in the output capacitance C2 if the reset signal S21b from the determination circuit 21 becomes active (high in the illustrated example) (i.e., the output voltage Vcp at the output node Nout is reset). In other words, when the stop signal S100 is active, the reset circuit 22 executes reset processing if the voltage value of the output voltage Vcp is higher than a predetermined value, or stops the reset processing if it is lower than the predetermined value. The reset circuit includes a resistance RRR, one or a plurality of diodes DDD and a transistor T22, for example.

As described above, by allowing the voltage generation circuit 105 to continue outputting the bias voltage Vb1 until the voltage value of the output voltage Vcp becomes smaller than a predetermined value, the voltage difference between the output voltage Vcp and the bias voltage Vb1 is prevented from exceeding the breakdown voltage of an element (control transistor M1, etc., for example), and thus breakdown of the element can be avoided. Moreover, by allowing the voltage generation circuit 105 to stop the output of the bias voltage Vb1 once the voltage value of the output voltage Vcp becomes smaller than the predetermined value, the power consumption of the voltage generation circuit 105 can be reduced.

Also, by allowing the reset circuit 22 to execute reset processing until the voltage value of the output voltage Vcp becomes smaller than a predetermined value, the output voltage Vcp can be swiftly reset at the time of stop of drive of the booster circuit 11, and thus the time required until the output voltage Vcp is stabilized can be shortened. This can shorten the test time in product mass testing.

Embodiment 3

Figure 9:
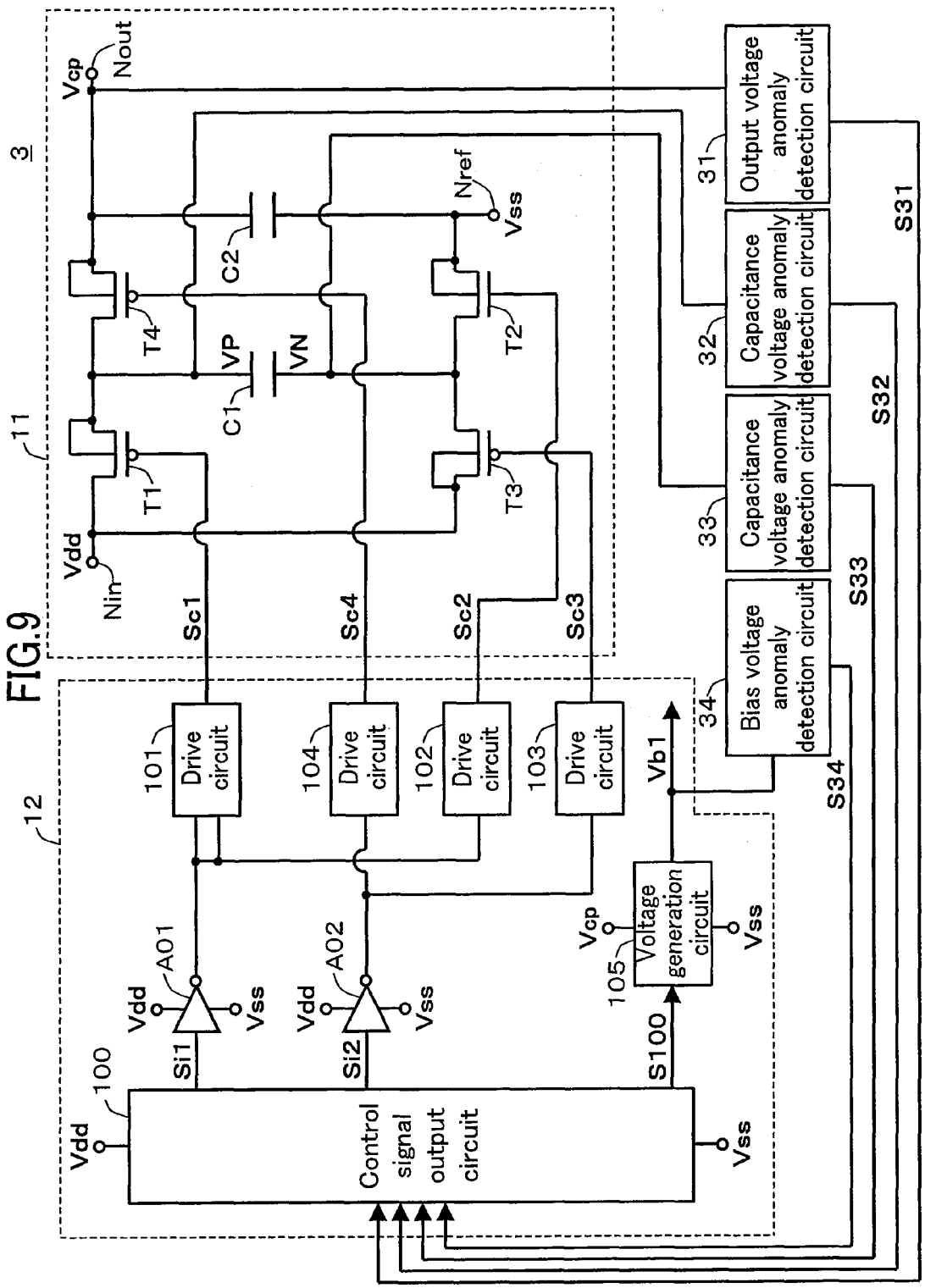
FIG. 9 is a view showing a configuration of a voltage conversion device of Embodiment 3 of the present invention.

FIG. 9 shows a configuration of a voltage conversion device 3 of Embodiment 3 of the present invention. The voltage conversion device 3 includes an output voltage anomaly detection circuit 31, capacitance voltage anomaly detection circuits 32 and 33 and a bias voltage anomaly detection circuit 34 in addition to the components shown in FIG. 1.

When the booster circuit 11 is in the drive state, the output voltage Vcp will not be lower than the power supply voltage Vdd. If the output node Nout is short-circuited with a ground node (reference node Nref in the illustrated example), however, a through current will occur between the output node Nout and the ground node, and as a result, the output voltage Vcp may become lower than the power supply voltage Vdd. Likewise, if one terminal of the booster capacitance C1 is short-circuited with the ground node, a through current will occur between the one terminal of the booster capacitance C1 and the ground node, resulting in that the voltage at the one terminal of the booster capacitance C1 (capacitance voltage VP) may become lower than the power supply voltage Vdd.

The output voltage anomaly detection circuit 31 outputs a detection signal S31 if detecting that the voltage value of the output voltage Vcp is lower than an output voltage threshold (the power supply voltage Vdd, for example). The capacitance voltage anomaly detection circuit 32 outputs a detection signal S32 if detecting that the voltage value of the capacitance voltage VP of the booster capacitance C1 is lower than a capacitance voltage threshold (the power supply voltage Vdd, for example).

If the other terminal of the booster capacitance C1 is short-circuited with a power supply voltage node (the input node Nin in the illustrated example), the capacitance voltage VN will be equal to the power supply voltage Vdd. At this time, when the drive transistor T2 is turned ON, a through current will occur between the other terminal of the booster capacitance C1 and the reference node Nref via the drive transistor T2. In contrast, if the other terminal of the booster capacitance C1 is short-circuited with a ground node (the reference node Nref in the illustrated example), the capacitance voltage VN will be equal to the ground voltage Vss. At this time, when the drive transistor T3 is turned ON, a through current will occur between the input node Nin and the other terminal of the booster capacitance C1 via the drive transistor T3.

The capacitance voltage anomaly detection circuit 33 outputs a detection signal S33 if detecting that the voltage value of the capacitance voltage VN of the booster capacitance C1 falls outside a predetermined range (range between a value somewhat lower than the power supply voltage Vdd and a value somewhat higher than the ground voltage Vss).

If the output terminal of the voltage generation circuit 105 is short-circuited with a power supply voltage node or a ground node, the voltage value of the bias voltage Vb1 may be greatly deviated from a desired value. In this case, breakdown may possibly occur in an element receiving the bias voltage Vb1 as a power supply voltage (the control transistor M1, the inverter circuit A11, etc.).

The bias voltage anomaly detection circuit 34 outputs a detection signal S34 if detecting that the voltage value of the bias voltage Vb1 falls outside a predetermined allowable range.

If at least one of the detection signals S31 to S34 becomes active, the control signal output circuit 100 outputs the reference signals Si1 and Si2 so that all the drive transistors T1 to T4 of the booster circuit 11 are turned OFF, to thereby put the booster circuit 11 in the non-drive state.

As described above, by detecting the abnormal states of the output voltage Vcp, the capacitance voltages VP and VN and the bias voltage Vb1, troubles such as breakdown of an element and heating due to an excessive current can be prevented.

The output voltage anomaly detection circuit 31, the capacitance voltage anomaly detection circuits 32 and 33 and the bias voltage anomaly detection circuit 34 are also applicable to the voltage conversion devices 1a and 2 shown in FIGS. 7 and 8.

(Audio System)

Figure 10:
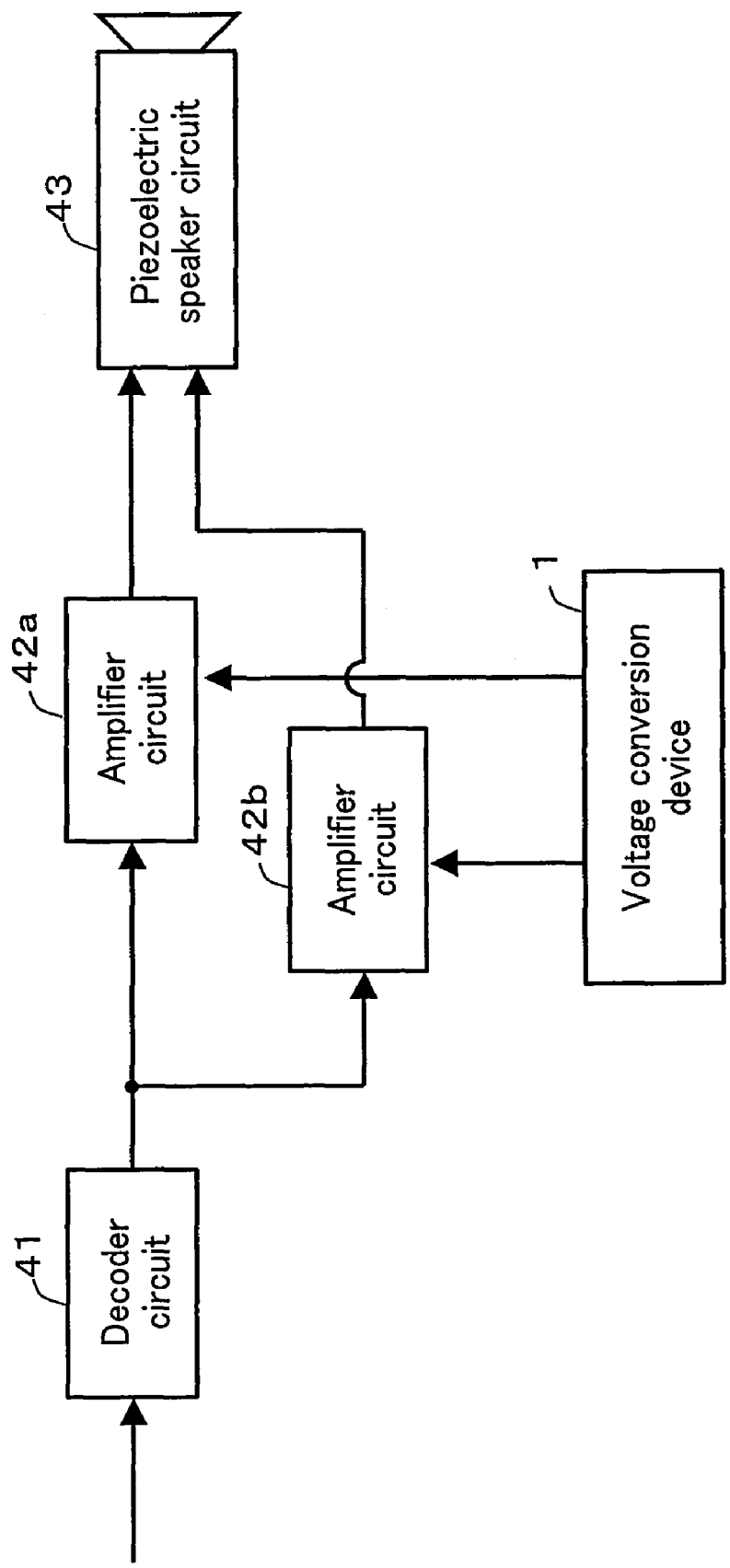
FIG. 10 is a view showing a configuration of an audio system provided with the voltage conversion device of FIG. 1.
Figure 11:
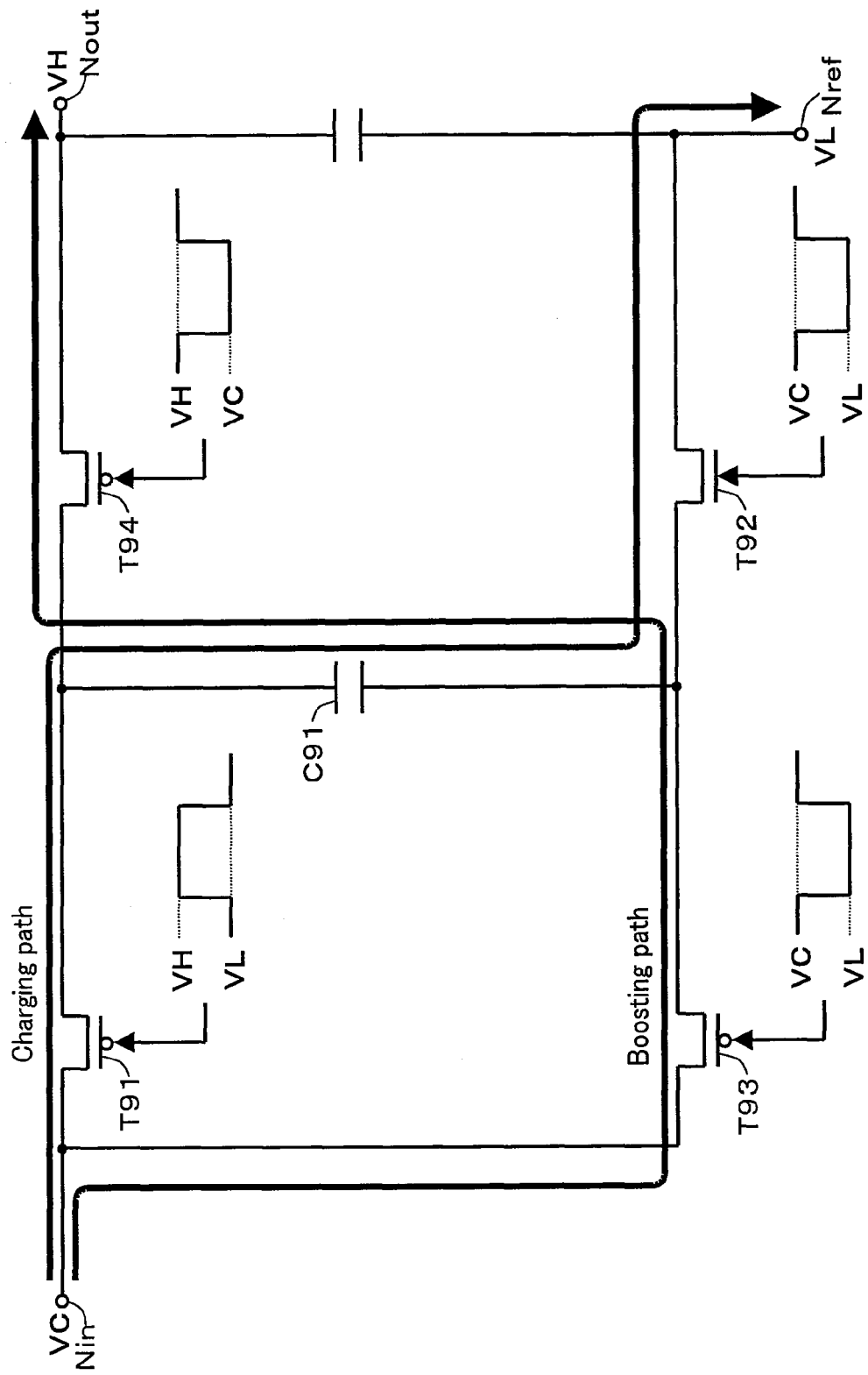
FIG. 11 is a view showing a configuration of a conventional charge-pump power supply device.

As shown in FIG. 10, the voltage conversion devices 1, 1a, 2 and 3 of the above embodiments are applicable to an audio system. The audio system of FIG. 10 includes a decoder circuit 41, paired amplifier circuits 42a and 42b and a piezoelectric speaker circuit 43 in addition to the voltage conversion device 1.

The decoder circuit 41 decodes audio data to output an audio signal. The amplifier circuits 42a and 42b operate using the output voltage of the voltage conversion device 1 as a power supply voltage: the amplifier circuit 42a amplifies the audio signal from the decoder circuit 41, and the amplifier circuit 42b inversely amplifies the audio signal from the decoder circuit 41, to thereby produce a differential signal. The piezoelectric speaker circuit 43 outputs sound based on the differential signal produced by the amplifier circuits 42a and 42b.

Other Embodiments

The above embodiments were described assuming that the input voltage is the "power supply voltage Vdd", the reference voltage is the "ground voltage Vss", the bias voltage supplied to the gate of the control transistor M1 (first bias voltage) is the "bias voltage Vb1", and the bias voltage supplied to the gate of the control transistor M2 (second bias voltage) is the "power supply voltage Vdd". These voltages are not limited to the ones specified, but the effect described above can be obtained as long as the voltage difference between the output voltage and the second bias voltage is smaller than or equal to the source-drain breakdown voltage of the control transistor M2 and the voltage difference between the first bias voltage and the reference voltage is smaller than or equal to the source-drain breakdown voltage of the control transistor M1.

Moreover, when the booster circuit 11 and the control circuit 12 are configured using transistors same in source-drain breakdown voltage, the voltage conversion device can be made to operate without occurrence of breakdown as long as all of the voltage difference between the output voltage and the first bias voltage, the voltage difference between the second bias voltage and the reference voltage, the voltage difference between the output voltage and the second bias voltage and the voltage difference between the first bias voltage and the reference voltage are smaller than or equal to the common source-drain breakdown voltage. For example, in FIG. 1, when the voltage conversion device is configured using transistors whose source-drain breakdown voltage is "Vdd", the input voltage may be set at "Vdd", the reference voltage at "Vss", the first bias voltage at "Vcp/2" and the second bias voltage at "Vdd". With this setting, the source-drain voltage will not exceed the source-drain breakdown voltage "Vdd" in any of the circuits.

As described above, according to the present invention, the amplitude of the output signal can be set without being restricted by threshold voltages. The present invention is therefore useful for a voltage conversion device for boosting an input voltage to output a boosted output voltage, like a charge-pump power supply device, and the like.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A voltage conversion device for boosting an input voltage to output a boosted output voltage, the device comprising:
    a booster circuit; and
    a control circuit for controlling operation of the booster circuit,
    wherein the booster circuit comprises:
    a booster capacitor;
    an output capacitor connected between an output node for outputting the output voltage and a reference node for receiving a reference voltage; and
    a connection switch section for connecting one terminal of the booster capacitor to an input node for receiving the input voltage and the other terminal of the booster capacitor to the reference node in a charging mode, and connecting the other terminal of the booster capacitor to the input node and the one terminal of the booster capacitor to the output node in a boosting mode,
    the connection switch section includes a first drive transistor for switching the connection between the input node and the one terminal of the booster capacitor in response to a first control signal swinging between the output voltage and the reference voltage,
    the control circuit comprises:
    a first control transistor connected between a first input node for receiving a first input signal swinging between the output voltage and a first bias voltage and an intermediate node for outputting the first control signal, the first control transistor receiving the first bias voltage at its gate; and
    a second control transistor connected between a second input node for receiving a second input signal swinging between a second bias voltage and the reference voltage in synchronization with the first input signal and the intermediate node, the second control transistor receiving the second bias voltage at its gate,
    the voltage difference between the output voltage and the second bias voltage is smaller than or equal to a source-drain breakdown voltage of the second control transistor, and
    the voltage difference between the first bias voltage and the reference voltage is smaller than or equal to a source-drain breakdown voltage of the first control transistor.

2. The voltage conversion device of claim 1, wherein the connection switch section further comprises:
    a second drive transistor for switching the connection between the other terminal of the booster capacitor and the reference node in response to a second control signal swinging between the input voltage and the reference voltage;
    a third drive transistor for switching the connection between the other terminal of the booster capacitor and the input node in response to a third control signal swinging between the input voltage and the reference voltage; and
    a fourth drive transistor for switching the connection between the one terminal of the booster capacitor and the output node in response to a fourth control signal swinging between the output voltage and the first bias voltage, and
    the control circuit further comprises:
    a signal generation section for generating first and second reference signals swinging between the input voltage and the reference voltage complementarily to each other, the second control signal and the third control signal;
    a first level shifter receiving the output voltage and the first bias voltage for shifting the first reference signal generated by the signal generation section to the first input signal; and
    a second level shifter receiving the output voltage and the first bias voltage for shifting the second reference signal generated by the signal generation section to the fourth control signal.

3. The voltage conversion device of claim 1, further comprising a voltage generation section for generating the first bias voltage based on the output voltage so that the first bias voltage varies with a variation of the output voltage.

4. The voltage conversion device of claim 3, wherein the voltage generation section receives a stop signal indicating stop of drive and stops output of the first bias voltage once the stop signal becomes active.

5. The voltage conversion device of claim 3, further comprising a determination circuit for determining whether or not the voltage value of the output voltage is greater than a predetermined value, the determination circuit also receiving a stop signal indicating stop of drive and determining whether or not the stop signal is active,
    wherein the voltage generation section stops output of the first bias voltage if the determination circuit determines that the voltage value of the output voltage is smaller than the predetermined value and that the stop signal is active, or otherwise continues output of the first bias voltage.

6. The voltage conversion device of claim 3, further comprising:
    a determination circuit for determining whether or not the voltage value of the output voltage is greater than a predetermined value, the determination circuit also receiving a stop signal indicating stop of drive and determining whether or not the stop signal is active; and
    a reset circuit for resetting the output voltage at the output node if the determination circuit determines that the voltage value of the output voltage is greater than the predetermined value and that the stop signal is active.

7. The voltage conversion device of claim 1, further comprising an output voltage anomaly detection circuit for detecting that the voltage value of the output voltage is smaller than an output voltage threshold, wherein the control circuit puts the booster circuit in a non-drive state if the output voltage anomaly detection circuit detects that the voltage value of the output voltage is smaller than the output voltage threshold.

8. The voltage conversion device of claim 1, further comprising a first capacitance voltage anomaly detection circuit for detecting that the voltage value of a voltage at the one terminal of the booster capacitor is smaller than a capacitance voltage threshold, wherein the control circuit puts the booster circuit in a non-drive state if the first capacitance voltage anomaly detection circuit detects that the voltage value of the voltage at the one terminal of the booster capacitor is smaller than the capacitance voltage threshold.

9. The voltage conversion device of claim 1, further comprising a second capacitance voltage anomaly detection circuit for detecting that the voltage value of a voltage at the other terminal of the booster capacitor falls outside a predetermined range, wherein the control circuit puts the booster circuit in a non-drive state if the second capacitance voltage anomaly detection circuit detects that the voltage value of the voltage at the other terminal of the booster capacitor falls outside the predetermined range.

10. The voltage conversion device of claim 1, further comprising a bias voltage anomaly detection circuit for detecting that the bias voltage falls outside an allowable range, wherein the control circuit puts the booster circuit in a non-drive state if the bias voltage anomaly detection circuit detects that the voltage value of the bias voltage falls outside the allowable range.

11. An audio system comprising:

the voltage conversion device of claim 1;

a decoder circuit for decoding audio data to output an audio signal;

an amplifier circuit operating using the output voltage of the voltage conversion device as a power supply voltage for converting the audio signal from the decoder circuit to a differential signal and amplifying the differential signal; and a speaker circuit for outputting sound based on the differential signal from the amplifier circuit.

* * * * *